United States Patent
De Haan et al.

(10) Patent No.: US 7,206,027 B2
(45) Date of Patent: Apr. 17, 2007

(54) SPATIAL RESOLUTION OF VIDEO IMAGES

(75) Inventors: Gerard De Haan, Eindhoven (NL); Rogier Lodder, Eindhoven (NL)

(73) Assignee: Koninklijke Philips Electronics N.V., Eidhoven (NL)

( * ) Notice: Subject to any disclaimer, the term of this patent is extended or adjusted under 35 U.S.C. 154(b) by 442 days.

(21) Appl. No.: 10/493,793

(22) PCT Filed: Oct. 18, 2002

(86) PCT No.: PCT/IB02/04347

§ 371 (c)(1),
(2), (4) Date: Apr. 27, 2004

(87) PCT Pub. No.: WO03/038753

PCT Pub. Date: May 8, 2003

(65) Prior Publication Data

US 2005/0018077 A1    Jan. 27, 2005

(30) Foreign Application Priority Data

Nov. 1, 2001    (EP) .................... 01204201

(51) Int. Cl.
*H04N 7/01*    (2006.01)
(52) U.S. Cl. ..................................... 348/448
(58) Field of Classification Search ............... 348/448, 348/451, 452, 449, 441, 446
See application file for complete search history.

(56) References Cited

U.S. PATENT DOCUMENTS

| 5,093,721 | A | * | 3/1992 | Rabii | 348/448 |
|---|---|---|---|---|---|
| 5,519,451 | A | | 5/1996 | Clatanoff et al. | 348/606 |
| 5,661,525 | A | | 8/1997 | Kovacevic et al. | 348/452 |
| 5,689,305 | A | | 11/1997 | Ng et al. | 348/416 |
| 5,936,676 | A | * | 8/1999 | Ledinh et al. | 348/452 |
| 6,118,488 | A | * | 9/2000 | Huang | 348/452 |
| 6,133,957 | A | | 10/2000 | Campbell | 348/458 |
| 6,262,773 | B1 | * | 7/2001 | Westerman | 348/448 |
| 6,377,307 | B1 | * | 4/2002 | Honda | 348/448 |
| 6,577,345 | B1 | * | 6/2003 | Lim et al. | 348/452 |
| 6,731,342 | B2 | * | 5/2004 | Shin et al. | 348/452 |
| 6,774,949 | B2 | * | 8/2004 | Ritter | 348/458 |
| 6,980,254 | B1 | * | 12/2005 | Nishihashi et al. | 348/452 |

OTHER PUBLICATIONS

"Progressive Scan Conversion using Edge Information", T. Doyle et al., Signal Processing of HDTV, II, 1990, pp. 711-721.

* cited by examiner

*Primary Examiner*—Paulos Natnael
(74) *Attorney, Agent, or Firm*—Larry Liberchuk

(57) ABSTRACT

The invention relates to a method and a device to increase the resolution of an image by interpolating along edges of the image. Edges are detected and their direction is calculated (10). The interpolation (12) of new pixels is carried out along the direction of the edges. According to the invention, a pre-filter (8) is used with a high-pass filtering in the direction in which new pixels are interpolated, and a low-pass filtering in another direction.

6 Claims, 2 Drawing Sheets

SPATIAL RESOLUTION OF VIDEO IMAGES

The invention relates to a method and a device to improve the resolution of video images.

Spatial scaling is necessary whenever the number of pixels on a video line, or the number of video lines in an input video signal differs from the number required for display. This is in case an interlaced video signal has to be de-interlaced for providing a progressive video signal or when an aspect ratio has to be adapted as the display device requests a different ratio as the original signal may provide. High quality spatial scaling is achieved by up-scaling using an interpolating low-pass filter. In this filter, an input signal is at first sampled with a sampling frequency twice the desired bandwidth. The samples are interpolated and then decimated by zero-stuffing methods. The bandwidth of the input signal is not degraded, but also no additional spectral components can be used to improve the picture.

In "Progressive Scan Conversion using Edge Information", T. Doyle et al., Signal Processing of HDTV, II, the use of 2-dimensional correlation of an image is disclosed. By using the correlation, it is possible to interpolate pixels along the highest correlation, i.e. along edges. Edges occur in pictures when a chrominance or luminance value changes rapidly along a line of pixels of the image. It has been proposed to look at three different values of pixel pairs as shown in FIG. 1. In FIG. 1, one image in a succession of interlaced images is depicted. Each pixel 2, 4 is represented by a value, e.g. an eight bit value. This value represents either the color or intensity of the pixel 2, 4 in a spatially corresponding location if the represented image.

A picture matrix as shown in FIG. 1 is represented by vertical pixel columns v and horizontal pixel lines h. Each image represents one half of a picture, which is completed by the following image representing the other half of the picture. To generate a progressive video signal, each image is filled with missing pixels by interpolation. In FIG. 1, black pixels 2 represent actual pixels in the video signal, and white pixels 4 represent missing pixels, which have to be interpolated It is proposed to look at the luminance value of three pairs a, b, c of pixels 2, in direction of +45°, −45°, and 90° from the horizontal. The intermediate pixel 4a is interpolated by using the value of the pixel pair with the smallest difference of their luminance value, as this is supposed to be a pair that does not cross an edge in the image.

A drawback of this method is that a thin vertical line through pixel 4a results in three pixel pairs a, b, c with the same difference. Interpolation then causes noise and artifacts in the image. This problem increases, if edges in a direction close to the horizontal are included in the correlation test. This is due to the fact that the differences are measured over a distance that is large compared to the maximum detail of the image.

Thus it is an object of the invention to increase the sharpness of the picture. To this end, the invention provides a method and a device as defined by the independent claims. The dependent claims define advantageous embodiments.

Advantageously, there may be a reduction of artifacts and noise caused by interpolation. Advantageously, new spectral components maybe provided through the edge-direction dependent interpolation, which is inherently non-linear.

In one axis, low detail areas are filtered by a high-pass filter. In areas with low detail, different interpolation methods may by appropriate. The result of the high-pass filter may be used for further processing of the image.

To decrease the impact of edges which have an angle between 0° and 45° to the first direction, along a second axis a low-pass filter filters high detail. In addition, the low-pass filter decreases the noise sensitivity of the pre-filter.

The output of the pre-filter is an image with increased detail in the first axis and with reduced detail in the second axis.

As the output of the pre-filter does only contain few pixels with values different from zero, a digital signal processor may be used for further processing, in particular interpolation. Spatial edges are detected from the output of the pre-filter by detecting zero crossings in the pre-filtered image. Zero crossings can be found when pixel values of consecutive pixels rapidly change their value from negative to positive or vice versa.

After edges are detected, the direction (angle) of the edges is detected. Interpolation is then carried out along the detected edges.

According to claim 2, the angle of an edge corresponds to the length of a bar of similarly valued pixel along the low-pass filtered axis. By counting the number of pixels above or below an adjustable threshold value, the length of a bar can be calculated. This length contains information about the angle of the edge.

Also, the position of neighboring bars may be used to determine the direction of an edge. According to claim 3, from a zero crossing the extreme position along the low-pass filtered axis of black and white bars on neighboring lines along the high-pass filtered axis may be evaluated and from the distance of the extreme positions the angle of the edge may be calculated.

In particular a $-¼, +½, -¼$ FIR high-pass filter and a $+⅓, +⅓, +⅓$ FIR low-pass filter are preferred. Orthogonal axes are preferred, such as horizontal and vertical axes.

Interpolation according to claim 4 is further proposed. From the original video image, directions of edges may be calculated from the number of pixels along the monotonous area around a zero crossing. By combining these two techniques, it is possible to decrease the interpolation error. In general, interpolation with high-pass and low-pass filtering is used, but in cases this interpolation is not exact, i.e. when areas of different edges approach each other, it may occur that bars of different edges will be supposed to be from one edge and connected. In this case interpolation is not correct. It is preferred that the calculated angle, which is closest to the high-pass filtered axis is selected from the two interpolation options.

To improve already de-interlaced video signals, a method according to claim 5 is proposed. In particular, the results from said high-pass filter may be used to determine the detection of an edge. In this case, interpolation according to the invention is better than standard interpolation. By instructing a multiplexer or a fader to multiplex/fade between standard (e.g. motion vector compensated) interpolated images and images that have been interpolated by high-pass and low-pass filtering and edge prediction, the sharpness can be improved for some images of a video signal. This post-processing of an already de-interlaced video signal improves image quality.

A preferred use of the present invention may be directed to the MPEG codec systems, especially those without the motion detection. Another preferred application is directed to High-End TV systems using scan rate conversion.

These and other aspects of the invention will be apparent from and elucidated with reference to the embodiments described hereinafter.

Figure 1:
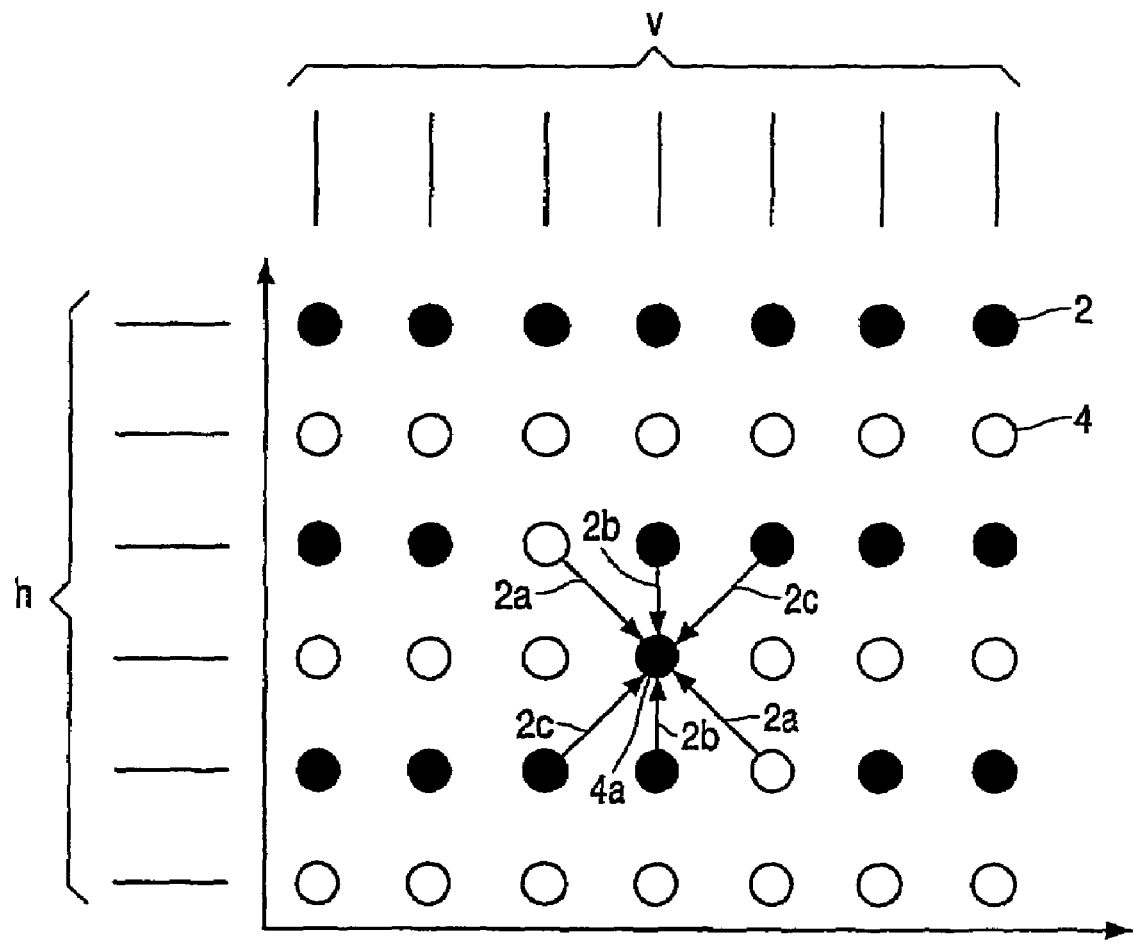
FIG. 1 shows a pixel matrix of an interlaced image.
Figure 2:
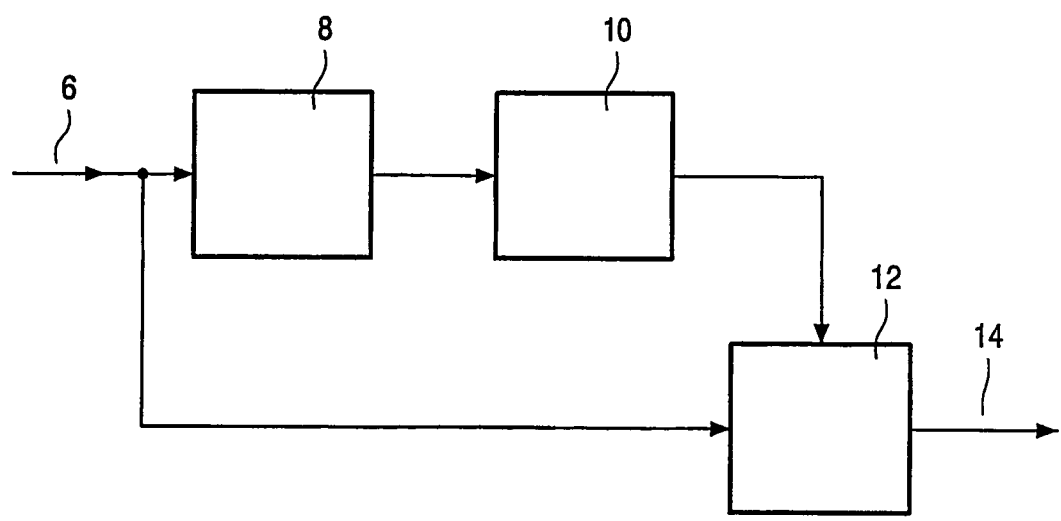
FIG. 2 shows diagrammatically an interpolation according to the invention.

FIG. 2 depicts a video signal input port 6, pre-filter circuitry 8, interpolation angle detection circuitry 10, edge-dependent interpolation circuitry 12, and a video signal output port 14.

For aspect ratio conversion, i.e. when a 4:3 TV signal has to be converted into a 16:9 TV signal, it is necessary to interpolate between horizontal pixels to add new pixels in between existing ones. To achieve good interpolation results, the interpolated pixels should be well predicted and match with the actual image.

A progressive video signal is fed to video signal input port 6. The pre-filter circuitry 8 carries out a horizontal spatial high-pass filtering and a vertical spatial low-pass filtering. These filters filter for instance the luminance component of the input video signal. So, the high-pass filtering is applied in the direction in which new pixels are needed, while the low-pass filtering is applied in the other direction. If the device of FIG. 2 is used to generate additional lines, a vertical high-pass filtering and a horizontal low-pass filtering are used. If the invention is to be used to e.g. first generate both additional pixels in the horizontal direction, and then additional lines in the vertical direction (this order may of course be reversed), in a first interpolation step the FIG. 2 device is used with a horizontal high-pass filtering and a vertical low-pass filtering, and in a second interpolation step the FIG. 2 device is used with a horizontal low-pass filtering and a vertical high-pass filtering.

By high-pass filtering along the vertical axis, high detail in vertical direction is passed through In case of horizontal lines, the vertical spatial frequency is high. Vertical lines may be better interpolated by different methods. Thus the output of the high-pass filter may be used to determine where different interpolation should be used.

By low-pass filtering along the horizontal axis, detail in horizontal direction is decreased. This means that vertical lines are not passed through the low-pass filter.

After pre-filtering, edges and their angles are detected by angle detection circuitry 10. First, zero crossings are detected along the horizontal axis. These zero crossings provide information about an edge in the image. Zero crossing is detected, if at least two positive and two negative pixels occur next to each other on one horizontal line.

At the zero crossings, the length of white and black bars reflect the required interpolation angle. Starting from a zero crossing point, the extreme horizontal position of positive and negative bars on upper and lower neighboring lines is detected. The difference between the most right and the most left position on the different lines determines the required angle.

The interpolation information is used to interpolate the original video signal in edge-dependent interpolation circuitry 12. The output of the edge-dependent interpolation circuitry 12 is fed to video output port 14.

Figure 3:
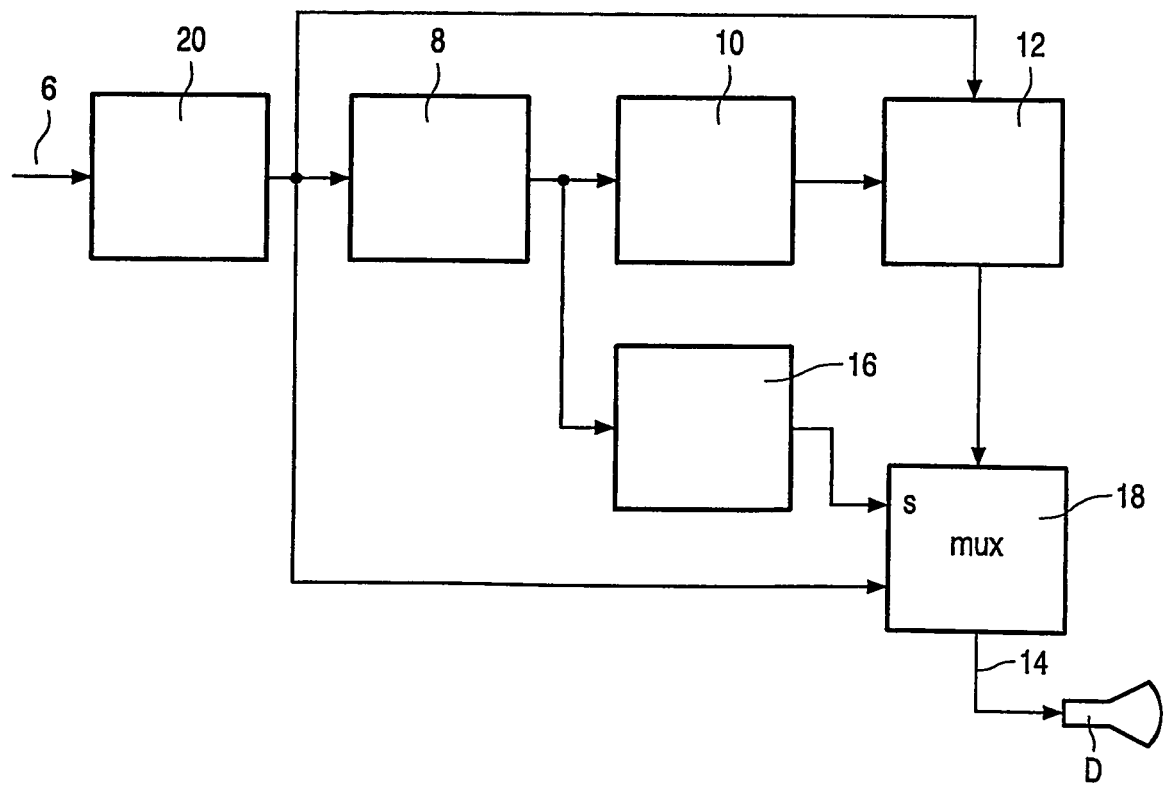
FIG. 3 shows diagrammatically a post-processing according to the invention.

FIG. 3 depicts in addition to FIG. 2, decision making circuitry 16, a multiplexer 18, and a motion-compensated de-interlacer 20.

In high-end TVs using scan rate conversion, edge-dependent interpolation might give better results than motion-dependent interpolation. By combining these two methods, the output video signal can be improved.

The output of pre-filter circuitry 8 gives information on whether an edge has been certainly detected. In case an edge has been certainly detected, the interpolation according to the invention is superior to the motion-compensated interlacing carried out by motion-compensated de-interlacer 20. In the embodiment of FIG. 3, the pre-filter 8 and the edge-dependent interpolator 12 use the original lines only, they do not use the lines that were interpolated by the motion-compensated de-interlacer 20.

The decision making circuitry 16 determines whether an edge has been certainly detected. In this case, the output of decision making circuitry 16 instructs multiplexer 18 (thru its control input s) to use the output signal from edge-dependent interpolation circuitry 12. In all other cases, the interpolated signal from motion-compensated de-interlacer 20 shall be used. The output signal is displayed on display device D.

By multiplexing these two interpolation methods, the quality of the output video signal at the video signal output port 14 is improved. Instead of a multiplexer (hard switch), a fader (soft switch) can be used.

The method according to the invention may also be applied to scale standard resolution to high-definition resolution. In this case, interpolation according to the invention is first carried out in the vertical domain and then in the horizontal domain. In the event of clear edges in the video image, interpolation according to the invention improves sharpness of the picture.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

Reference Signs:

| | |
|---|---|
| 2 | image pixel |
| 4 | interpolated pixel |
| 6 | video signal input port |
| 8 | pre-filter circuitry |
| 10 | angle detection circuitry |
| 12 | edge-dependent interpolation circuitry |
| 14 | video signal output port |
| 16 | decision making circuitry |
| 18 | multiplexer |
| 20 | motion-compensated de-interlacer |
| D | display device |

What is claimed is:

1. A method of spatially interpolating an input video image to obtain new pixels between existing pixels of said input video image in a first direction, the method comprising the steps of:

pre-filtering said input video image by spatially high-pass filtering said input video image in said first direction and spatially low-pass filtering said input video image in a second direction;

calculating a spatial direction of edges in said input video image from an output of said pre-filtering by locating first zero crossings of pixels along a low-pass fitered axis and locating for said first zero crossings at least two zero crossings arranged symmetrically around said first zero crossings with an offset of at least one pixel along a high-pass filtered axis; and interpolating said new pixels along said spatial direction of said edges.

2. A method according to claim 1, characterized by calculating said spatial direction of said edges by counting a number of pixels oriented in said low-pass filtered axis in said input video image which are below or above a threshold value.

3. A method according to claim 1, characterized by calculating a number of pixels in a monotonous area around a zero crossing in said pre-filtered image, calculating the direction of said edges by said number of pixels, comparing said spatial direction of said edges calculated from said pre-filtering with said spatial direction of said edges calculated from said number of pixels, and deciding which direction of edges is closest to one of said axes.

4. A method according to claim 1, characterized by
making a decision whether an edge direction has been detected,
de-interlacing an input video signal for providing a progressive video signal, and
multiplexing or fading between said de-interlacing and said interpolating according to the decision of edge detection.

5. A device for spatially interpolating an input video image to obtain new pixels between existing pixels of said input video image in a first direction, the device comprising:

pre-filter means for carrying out a spatial high-pass filtering in said first direction and a spatial low-pass filtering in a second direction;

calculation means for calculating a direction of an edge from an output of said pre-filter means in said input video image by locating first zero crossings of pixels along a low-pass filtered axis and locating for said first zero crossings at least two zero crossings arranged symmetrically around said first zero crossings with an offset of at least one pixel along a high-pass filtered axis; and interpolating means for interpolating said new pixels along said calculated edge.

6. A display apparatus for spatially interpolating an input video image to obtain new pixels between existing pixels of said input video image in a first direction, comprising:

pre-filter means for carrying out a spatial high-pass filtering in said first direction and a spatial low-pass filtering in a second direction;

calculation means for calculating a direction of an edge from an output of said pre-filter means in said input video image by locating first zero crossings of pixels along a low-pass filtered axis and locating for said first zero crossings at least two zero crossings arranged symmetrically around said first zero crossings with an offset of at least one pixel along a high-pass filtered axis;

interpolating means for interpolating said new pixels along said calculated edge to provide an interpolated image; and a display device for displaying said interpolated image.

* * * * *